Figure 1:
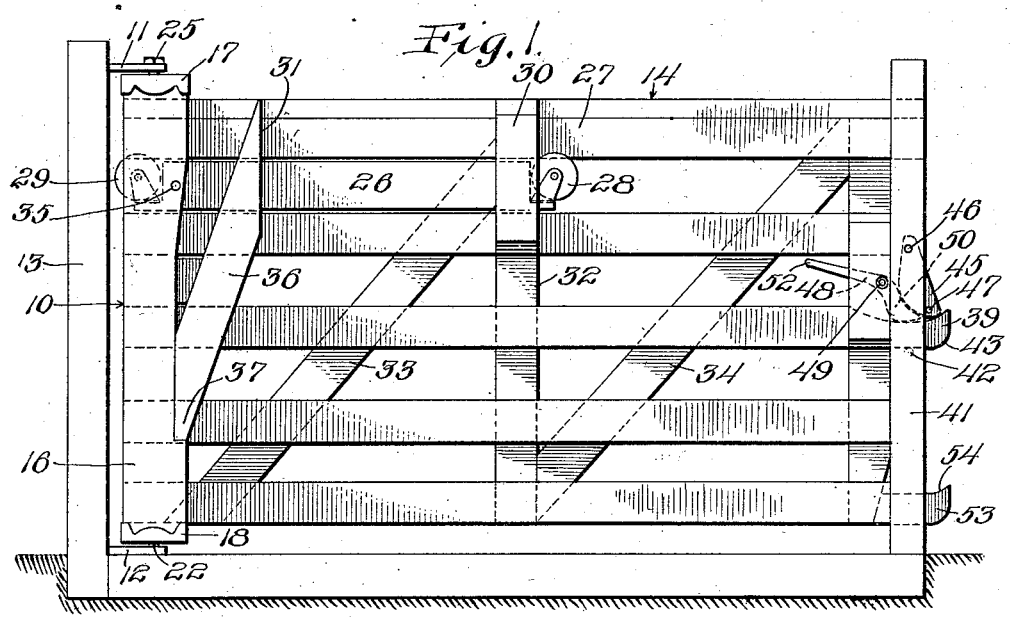

E. E. ERTSMAN.
FENCE GATE.
APPLICATION FILED DEC. 29, 1911.

1,056,740.

Patented Mar. 18, 1913.

3 SHEETS—SHEET 1.

Witnesses:
Harry S. Gaither
Ephraim Banning

Inventor:
Edward E. Ertsman
By Banning & Banning
Att'ys.

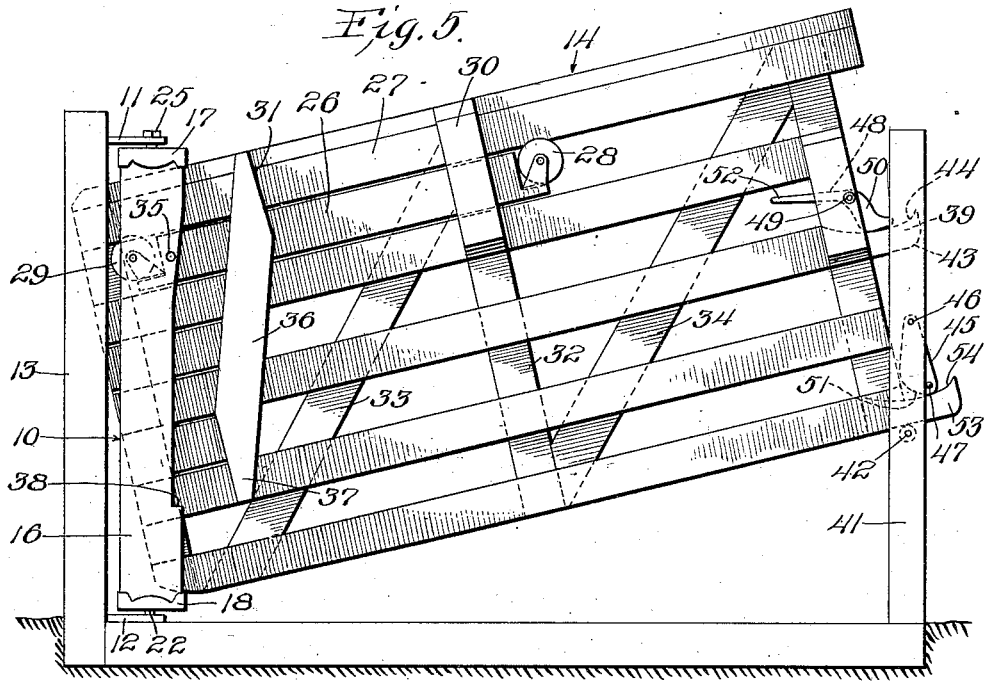
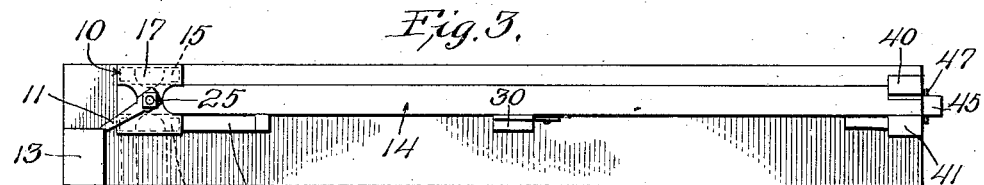
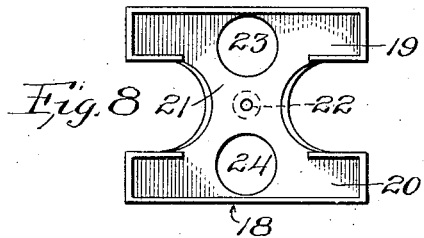

E. E. ERTSMAN.
FENCE GATE.
APPLICATION FILED DEC. 29, 1911.
1,056,740.
Patented Mar. 18, 1913.
3 SHEETS—SHEET 3.
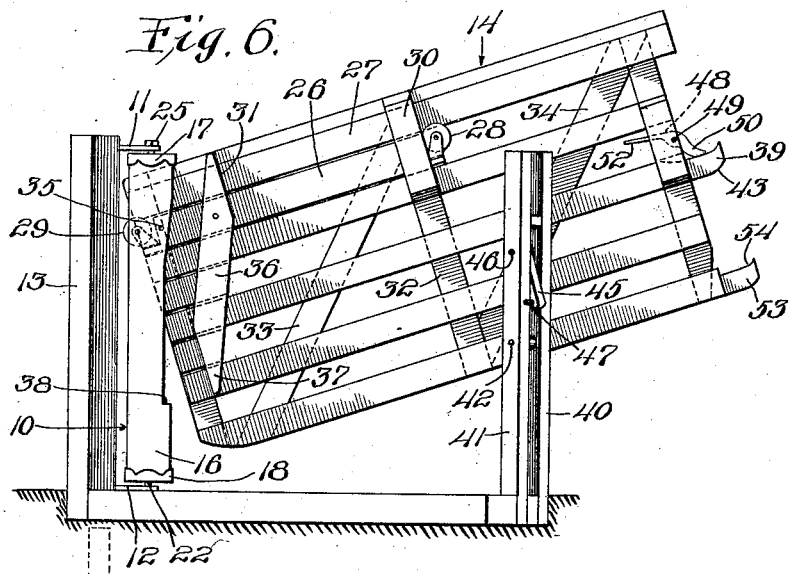
Witnesses:
Harry S. Gaither
Ephraim Banning
Inventor:
Edward E. Ertsman
By Banning & Banning
Attys.

UNITED STATES PATENT OFFICE.

EDWARD E. ERTSMAN, OF CHICAGO, ILLINOIS.

FENCE-GATE.

1,056,740. Specification of Letters Patent. Patented Mar. 18, 1913.

Application filed December 29, 1911. Serial No. 668,425.

*To all whom it may concern:*

Be it known that I, EDWARD E. ERTSMAN, a citizen of the United States, residing at Chicago, in the county of Cook and State of Illinois, have invented certain new and useful Improvements in Fence-Gates, of which the following is a specification.

The present invention has reference to a new and useful improvement in fence gates, and particularly such as are to be used for comparatively large openings. It will presently appear, however, that the gate of the present invention is in no wise restricted to large openings, as it has many features of advantage and desirability for use in comparatively small openings.

The invention also has reference to a gate for use in farm fences, although it will also be seen that its use is not restricted to such locations.

The present invention relates to a gate which is in some ways a combination swinging and sliding gate. It is so constructed that it may be slid directly in and out, or so that it may be swung about one end. Thus it may be either swung or slid, or it may be swung and slid at the same time.

In addition to the aforementioned characteristics, it is desired to provide a gate having a number of other important and valuable features. For example, one of the objects of the present invention is, to provide a gate the forward end of which may be raised without raising the rear end, so that a comparatively small clearance may be provided beneath the gate, through which to pass small stock, such as pigs or sheep, and thus to enable a separation of small from large stock. At the same time, it is desired to carry the gate in such a way that it may be swung while in this raised or tilted position, thus enabling it to swing or pass over drifts of snow or other matter lying on the ground, which would otherwise have to be cleared away to permit the swinging movement.

One of the main objections to the ordinary swinging gate is that a large area of ground space is necessary to permit a long gate to be swung. This makes it necessary, for example, that a buggy or wagon which is to pass through the opening must stand back from the gate a sufficient distance to permit the same to be swung. But a further and more serious objection to the ordinary swinging gate is that on account of its size and weight, and on account of the leverage imposed by reason of its length, very large strains or forces are imposed on the hinges, so that the hinge post must be of unusual size and strength, and buried an unusual distance in the ground. Furthermore, the hinges themselves must be unusually heavy and strong. All of the above objections relate to the mounting of the ordinary swinging gate. In addition to these objections, such a gate itself must be exceptionally strong and well reinforced, as otherwise it will be distorted and strained so that it will soon be forced out of true, and cease to properly fit the opening which it is intended to close, and so that the latch or other catch will soon cease to lock properly.

While it is intended that the gate of the present invention may be swung, still the same is so carried that, prior to swinging it, it may be slid part way back, so that the hinges or pivotal mountings are largely relieved from the leverage due to the swinging, because the center of gravity is thus thrown more nearly over the pivotal point.

In addition to the above enumerated features, the present invention has reference to a new form of latch or lock, whereby, when the gate is closed, it will be automatically latched, and which latch or lock will immediately grip or catch the gate or a member carried by the same, so as to absolutely prevent opening the gate until the latch has been thrown.

Another object of the invention is to provide a roller mounting for the gate so that the same may be more easily slid open or closed, such roller mounting, however, being a part of the gate and its support.

Other objects and uses will appear from a detailed description of the invention, which consists in the features of construction and combination of parts hereinafter described and claimed.

Figure 2:
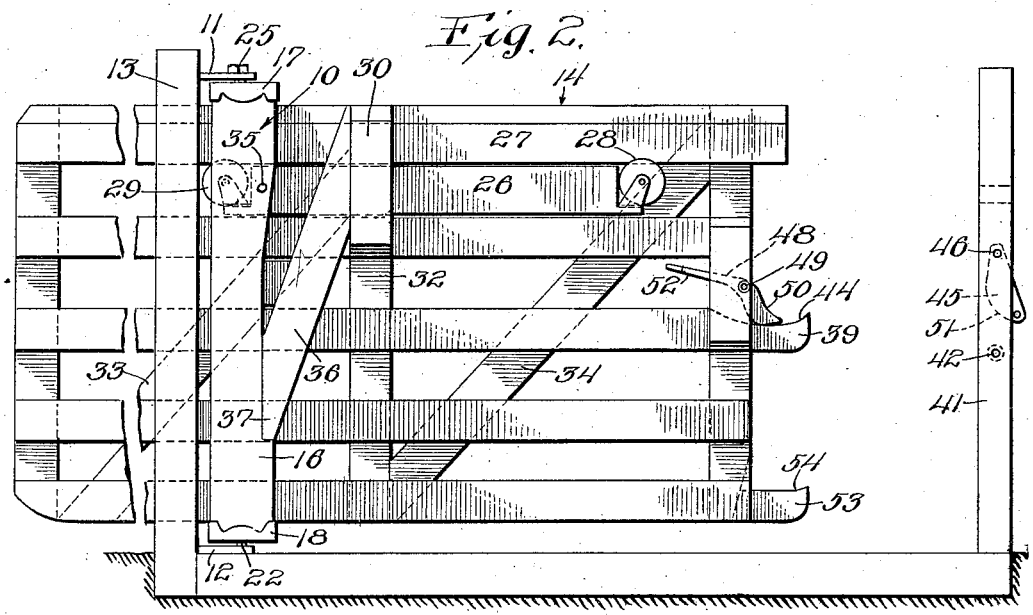

In the drawings, Figure 1 shows a side elevation of the gate in normal closed position; Fig. 2 shows a side elevation of the gate when the same is slid part way open to provide a small clearance to pass a horse, for example; Fig. 3 shows a plan view of the gate in closed position, and shows by dotted lines the position of the gate when swung open without any accompanying sliding motion; Fig. 4 shows a plan view of the gate in the position of Fig. 2, and shows by dotted lines that while the gate is slid back in such position it may also be swung into the dotted line position; Fig. 5 shows a side view of the gate with its forward end raised to permit small stock, such as pigs and sheep, to pass beneath it; Fig. 6 shows how the gate may be swung while its forward end is in the raised position of Fig. 5, thus permitting it to be swung over a drift or bank of snow or other similar obstruction; Fig. 7 shows a view looking at the rear end of the gate, showing the post member and the roller mounting of the gate member; Fig. 8 shows an enlarged detail view of the lower cap; and Fig. 9 shows an enlarged detail of the latch mechanism.

In the embodiment of my invention, I provide a pivoted post member, or the like, with respect to which the gate member is slidingly mounted. By this means the gate member may be swung directly on or with the post member, or it may be slid and swung on or with respect to the same. Any suitable pivotal mounting is provided for this pivoted post member.

Referring now to the drawings, the numeral 10 denotes the post member. The same is pivotally mounted, in the present instance, by a pair of brackets 11 and 12 carried by a fixed post or other device 13. The details of this pivotal mounting will be described presently.

The numeral 14 designates the gate member. The same is slidingly mounted with respect to the pivoted member so that it may be slid back into the positions shown in Figs. 2 and 4. In the particular construction herein illustrated the pivoted member comprises a pair of separated uprights 15 and 16 between which the gate member rides, said uprights being joined and carried at their upper and lower ends by caps 17 and 18, respectively. Fig. 8 shows in detail a plan view of the lower cap. The same is provided with pockets 19 and 20 for receiving the lower ends of the upright members, said pockets being joined by a cross-piece 21, which has a downwardly extending pin 22. The latter seats within a socket of the lower bracket. In order to effectively drain this lower cap, the same is provided with a pair of drain holes 23 and 24, which partially register with the sockets 19 and 20, so that water cannot accumulate within the pockets. The upper bracket 17 is similar to the lower one, except in this case it is preferred that a tap bolt or the like 25 be passed through the supporting arm 11 into the bracket, the same taking the place of the lug 22 of the lower bracket.

As previously stated, the gate member is slidingly mounted within the pivoted member. In the construction illustrated, this mounting takes the form of an arm 26 carried by the pivoted member, such arm adapted to carry and support the upper rail 27 of the gate member so that the latter may be slid back and forth with respect to the arm, and with respect to the pivoted member. In order to facilitate such sliding movement, rollers 28 and 29 are carried by the arm, the same preferably being grooved to insure that the rail 27 will maintain proper registry with them at all times. Now, obviously, the gate member may be slid back on the arm 26 any distance, depending upon such stops as may be provided for limiting such sliding movement. In the present case, a stop member 30 is provided on the gate member, the same serving not only as a stop but also as a reinforcing member. This it does by contacting the surface 31 of a member carried by the arm 26. In addition to the stop member 30, other reinforcing members 32, 33 and 34 may be provided for the gate, the same being of any suitable form for providing the required stiffness in the gate.

Now it is obvious that the gate may be swung in either direction, by reason of the pivotal mounting of the member 10, and it is also evident that the gate may be swung after it has been slid back, this fact being clearly illustrated in Fig. 4. By sliding the gate into the position shown in Fig. 2, a comparatively narrow vertical clearance is provided, sufficient, for example, to permit a horse to pass through. If a greater clearance than the above is necessary, then the gate member may afterward be swung wide open, as shown by the dotted lines in Fig. 4, so that the full amount of opening becomes available. However, as soon as the gate member has been slid back into the position of Fig. 2 its center of gravity is carried more nearly over the pivotal mounting of the member 10, so that the strain on the arms or brackets which constitute such pivotal mounting is greatly relieved and consequently, when the gate is swung open, the post 13 and associated parts will not be subject to anywhere near as large stresses and strains as would otherwise be imposed on them. In other words, by combining the sliding mounting with the pivotal mounting the twisting and deflecting forces are so reduced that a much lighter and cheaper support may be provided for a gate of given size and weight than would otherwise be necessary. Nevertheless, should it be desired, the gate may be swung entirely open without more than a very small amount of sliding movement, as is well shown by the dotted lines in Fig. 3.

As heretofore stated the gate member is also carried in such a way that its forward end can be raised to provide a clearance beneath it for small stock to pass through, or to permit the gate to be swung while in such raised position so that it can be easily cleared over banks or drifts of snow. To permit of this raising movement, the carrying arm 26 is pivoted to the member 10 at the point 35. By this means the forward end of the gate can be raised up, as shown in Figs. 5 and 6, the arm 26 rotating on its pivot. In order to properly sustain the arm 26 when the gate is in lowered position, I provide a bracket member 36 on the arm, the lower end 37 of the same being adapted to seat into a socket or notch 38 of the upright 16. The instant that the lower end 37 seats in such pocket, a very efficient bracket or support is provided for the arm 26, so that the same is effectively supported and provides a rigid carrier for the gate member. In the particular construction illustrated, this bracket arm 36 serves to provide the contacting surface 31 against which the reinforcing stop member 30 of the gate member contacts.

Now when the gate has been raised as shown in Fig. 5, it may also be swung as shown by the perspective view of Fig. 6. In this manner the member can be easily raised or cleared over a bank or drift of snow, so that the full opening can be obtained without having to dig away the snow from a comparatively large area of ground.

As previously stated, one of the objects of the invention is to provide a new form of latch for locking the gate securely. The same comprises a cam projection 39 extending from the front end of the gate, and adapted to seat between the front posts 40 and 41. This projection is adapted to rest on a pin or roller 42 between the front posts, and in order to insure that the member 39 will ride upon the roller so as to raise the front end a slight amount, and thus carry a portion of the weight of the gate member, the member 39 has its lower surface tapered or rounded at 43 so that it will ride up on the roller as the gate is closed, and thus raise the gate. Now the upper surface of this member 39 is of cam-shape, as shown at 44, so that a dog 45 pivoted at 46 between the front posts, will catch on such surface 44 with a toggle action, in case an attempt is made to draw the gate back while the dog is in lowered position. In order to hold back the dog at such time, it is provided with a pin 47, which contacts the faces of the front posts.

Now to unlock the gate it is only necessary to swing the dog forwardly, as shown in Fig. 9. This may be done by simply grasping the dog in the hand, but I have provided special means for raising the dog. The same comprises a lever 48 carried by the gate member and pivoted at the point 49. The forward end 50 of this lever is rounded in a peculiar manner to engage the lower surface 51 of the dog, so that when the handle end 52 of the lever is depressed the dog will be thrown forwardly and upwardly, as shown in Fig. 9, until it clears the cam surface of the projection 39. Then the gate may be slid back and swung in either direction. The instant the gate is forced closed the dog will drop back into position and lock the gate in closed position.

Now in order to sustain the gate member in the position shown in Fig. 5, the projection 53 may be provided on the lower end of the gate. This projection is properly spaced to ride up on the roller 42, and is also provided with a cam surface 54, so that the dog will serve to lock the gate in such position. In this case, also, the dog may be disengaged by hand, or a lever similar to the lever 48 may be provided.

Obviously many changes of construction may be adopted without departing in any way from the spirit of my invention, and I do not limit myself to any particular construction except as called for by the claims.

I contemplate within the scope of my invention any form of gate in which the sliding movement is combined with the pivotal mounting, or in which both of the above are combined with an arrangement which permits the forward end of the gate to be raised to provide a clearance beneath it.

I claim:

1. In a fence gate, the combination of a vertical post member, a pivotal mounting for the same, an arm, a pivotal connection between the arm and the post, a bracket member secured to the arm, a stop on the post adapted to sustain the lower end of the bracket for supporting the arm, a pair of rollers on the arm, a gate mounted on the rollers, and a stop on the gate in position to engage the bracket for limiting the movement of the gate on the rollers, substantially as described.

2. In a gate, the combination of a vertical post, a pivotal mounting for the same, an arm, a pivotal connection between one end of the arm and the post, a bracket having its upper end secured to the arm, a stop on the post for engaging the lower end of the bracket to sustain the arm in substantially horizontal position, a gate slidably mounted on the arm, and a stop on the gate in position to engage the upper end of the bracket for limiting the sliding movement of the gate, substantially as described.

3. In a device of the class described, the combination of a pair of upright members, means for spacing the same a fixed distance apart to provide a slot between them, pivotal supporting means for both of the upright members, whereby they may swing in unison, an arm pivoted to the inner face of one of the upright members at a point adjacent its upper end, whereby there is provided a space between said arm and the inner face of the other upright member, means for supporting the arm in substantially horizontal position, a gate entered between the upright members, and a portion of the gate adapted to move between the aforementioned arm and the opposite upright member and to be supported on the upper face of the arm, whereby when the gate is in extended or closed position its rear end may freely enter between the upright members to permit the gate to be swung freely in either direction, substantially as described.

4. In a device of the class described, the combination of a pair of upright members, means for supporting them a fixed distance apart, pivotal supporting means for both of the upright members, whereby they may swing in either direction, an arm entered between the upright members, a pivotal connection between said arm and inner face of one of the upright members, whereby there is provided a space between the arm and the other upright member, a gate mounted for movement between the upright members, and a portion of the gate which is adapted to overlie the upper edge of the arm and be supported thereby, whereby the gate is free for movement in the space between the arm and the second upright member, and whereby the gate may be completely extended or closed to draw its rear end between the upright members to permit the gate to swing freely in either direction, substantially as described.

5. In a device of the class described, the combination of a vertically extending slotted member, pivotal supporting means for the same, whereby the member is free to swing in either direction, an arm entered within the slot of the upright member, a supporting connection between the arm and one side of the slot, whereby there is provided a clearance between the arm and the other side of the slot, a gate mounted for movement within the slot, and a portion of the gate which is adapted to overlie the arm and be supported by the same, whereby the gate is free for movement in the slot, and whereby the gate may be completely extended or closed to bring its rear end within the slot and to permit the gate to swing freely in either direction, substantially as described.

6. In a device of the class described, the combination of a vertically extending slotted member and pivotal supporting means therefor, an arm entered within the slot of the upright member, a supporting connection between the arm and the upright at one side of the slot, whereby there is provided a clearance between the arm and the upright at the other side of the slot, a gate mounted for movement within the slot in said clearance, and having its rear end free to enter within said clearance to bring said rear end flush with the pivoted slotted member, and a portion of the gate adapted to overlie the arm and be supported by the same, substantially as described.

EDWARD E. ERTSMAN.

Witnesses:
Thomas A. Banning, Jr.,
Ephraim Banning.

---

Copies of this patent may be obtained for five cents each, by addressing the "Commissioner of Patents, Washington, D. C."